(12) United States Patent
Onoda et al.

(10) Patent No.: US 6,199,368 B1
(45) Date of Patent: Mar. 13, 2001

(54) COAL GASIFICATION COMBINED CYCLE POWER GENERATION PLANT AND AN OPERATING METHOD THEREOF

(75) Inventors: Akihiro Onoda, Kawasaki; Yasunori Iwai, Yokohama, both of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/138,674

(22) Filed: Aug. 24, 1998

(30) Foreign Application Priority Data

Aug. 22, 1997 (JP) .................................. 9-226606

(51) Int. Cl.$^7$ .................................................. F02C 3/20
(52) U.S. Cl. .................................... 60/39.463; 60/740
(58) Field of Search ............................ 60/39.463, 740

(56) References Cited

U.S. PATENT DOCUMENTS

| | | | |
|---|---|---|---|
| 4,327,547 | * | 5/1982 | Hughes et al. .................... 60/39.42 P |
| 4,442,665 | | 4/1984 | Fick et al. . |
| 4,726,192 | | 2/1988 | Willis et al. . |
| 5,615,555 | | 4/1997 | Mina . |
| 6,038,863 | * | 3/2000 | Keller et al. ........................... 60/742 |

FOREIGN PATENT DOCUMENTS

| | | |
|---|---|---|
| 196 52 899 | 6/1998 | (DE) . |
| 0 399 336 | 11/1990 | (EP) . |
| 62-182532 | 8/1987 | (JP) . |

* cited by examiner

Primary Examiner—Charles G. Freay
Assistant Examiner—Ehud Gartenberg
(74) Attorney, Agent, or Firm—Oblon, Spivak, McClelland, Maier & Neustadt, P.C.

(57) ABSTRACT

A coal gasification combined cycle power generation plant generally includes a gas turbine system, a fuel supply system, an air supply system and an exhaust gas system, which are operatively connected to each other. The gas turbine system includes a combustor for selectively burning a coal gasification fuel obtained by gasifying a coal and a liquid fuel atomized by an atomization air and a gas turbine to which a combustion gas generated in the combustor is supplied. The fuel supply system is provided with a liquid fuel supply passage for the combustor through a fuel nozzle provided for the combustor, an atomization air supply passage for the combustor through the fuel nozzle and a coal gasification fuel supply passage for the combustor through the fuel nozzle, all of these supply passages being arranged so as to be adjacent to each other. The atomization air supply passage is provided with an outlet portion to which a branching outlet port for injecting the atomization air toward an outlet portion of the coal gasification supply passage is formed so as to secure a minimum flow rate for preventing the coal gasification fuel from conversely flowing into the fuel nozzle.

4 Claims, 8 Drawing Sheets

COAL GASIFICATION COMBINED CYCLE POWER GENERATION PLANT AND AN OPERATING METHOD THEREOF

BACKGROUND OF THE INVENTION

The present invention relates to a coal gasification combined cycle power generation plant or facility which selectively burns a coal gasification fuel and a liquid fuel so as to generate a power and also relates to a method of operating the same, particularly for suitably preventing a combustion gas from conversely flowing into a fuel passage of a coal gasification fuel when using a liquid fuel and for improving a safety in a combustor section.

In recent years, in a viewpoint of an effective utilization of natural resources, there has been made a study and development of a coal gasification power generation equipment which uses a coal gasification fuel as a heat source in a gas turbine power generation plant, a combined cycle power generation plant or the like.

In the coal gasification power generation equipment, a coal gasification fuel is generated from coal by a coal gasification furnace with the use of an air compressed by a gas turbine compressor or oxygen generated by leading the air to an air separator. The coal gasification fuel thus generated is supplied to a gas turbine combustor so as to be burned, and then, by the generated combustion gas, a gas turbine is driven to generate a power.

However, the coal gasification fuel has a worse combustibility as compared with a liquid fuel or a natural gas fuel and has a small calorific value. Further, in the case where a combustion gas temperature in the combustor becomes low, a lot of carbon monoxide is discharged, thus providing a problem in operational characteristics during a low load operation. Therefore, it is desirable to employ a combined cycle facility for compensating the defect of coal gasification fuel by burning other fuels during a starting operation or a low load operation. In such viewpoint, a liquid fuel has been employed as other fuel used in the combined cycle plant.

As described above, the coal gasification combined cycle equipment includes a combustor which can selectively burn a coal gasification fuel gasified coal and a liquid fuel atomized by an atomization air and is constructed in a manner that a combustion gas generated by the combustor is supplied to a gas turbine so that a generator is driven by a power of the gas turbine.

For example, first, the liquid fuel is supplied to the combustor to be burned, and thereby, the gas turbine starts up. When the gas turbine starts up a generation of coal gasification fuel is simultaneously started in a coal gasification furnace. In an operation of the coal gasification furnace during the start-up, an compressed air from an auxiliary compressor or oxygen separated from the compressed air by an air separator is used. After the start-up, an air compressed by a gas turbine compressor or oxygen separated from the compressed air by the air separator is used.

In an operation stage until about one fourth (¼) load of the gas turbine from the start-up operation, an incomplete coal gasification fuel having a low calorific value is merely generated in the coal gasification furnace. Such a coal gasification fuel is not applicable to a gas turbine operation, and for this reason, the fuel as described above has been conventionally supplied to the combustor.

With a rise of load after that stage, in the coal gasification furnace, a complete coal gasification fuel combustible in the combustor is generated. In this stage, a a combustion operation of using the liquid fuel is changed over to a combustion operation of using the coal gasification fuel, and then, only coal gasification fuel operation is carried out up to a gas turbine rating point.

As described above, the coal gasification fuel has a small calorific value as compared with a liquid fuel or a natural gas. Thus, in the case where a combustion gas temperature in the combustor becomes low, a lot of carbon monoxide is discharged, and therefore, there is a problem in operational characteristics during a low load operation. For this reason, in the case where the gas turbine is in a load dump state or when the gas turbine is stopped, the operation change-over is again made from the operation of using the coal gasification fuel to the operation of using only the liquid fuel.

FIG. 10 is a view schematically showing an entire structure of a combustor included in the aforesaid coal gasification combined cycle power generation plant, and FIG. 11 is an enlarge sectional view showing a fuel nozzle section of the combustor.

As shown in FIG. 10, a combustor 1 is constructed in a manner that a combustor liner 4 used as an inner cylindrical casing is inserted into an outer cylindrical casing 2 with a combustion air passage 3 defined therebetween, a fuel nozzle 5 is provided on an end portion on an upstream side of the combustor liner 4, and a transition piece 6 is connected to a downstream side of the combustor liner 4. An inner circumferential portion of the outer cylindrical casing 2 is provided with a flow sleeve 7 which covers the combustion air passage 3 and functions as an air guide.

The fuel nozzle 5 has a multiple cylindrical structure fixed to a head plate 8 provided on the end portion of the outer cylindrical casing 2. Further, the fuel nozzle 5 is provided, at its outer end positioned on the outside thereof, with a liquid fuel supply port 9 for supplying a liquid fuel, an atomization air supply port 10 for supplying an atomization air for atomizing the liquid fuel, and a coal gasification fuel supply port 11 for supplying a coal gasification fuel.

As shown in FIG. 11, the fuel nozzle 5 is formed with a liquid fuel passage 12 for passing the liquid fuel at the center portion on the internal side thereof, an atomization air passage 13 for passing an atomization air of the liquid fuel at the outer side of the liquid fuel passage 12, and further, a coal gasification fuel passage 14 for passing the coal gasification fuel at the outer side of the atomization air passage 13. These passages 12, 13 and 14 are arranged side-by-side in a manner of being partitioned by cylindrical walls 15 and 16 and communicate with the liquid fuel supply port 9, the atomization air supply port 10 and the coal gasification fuel supply port 11, respectively.

Moreover, an inner end portion of the fuel nozzle 5 facing the inside of the combustor liner 4 is provided with a liquid fuel injection port 17 for injecting a liquid fuel "a" from the liquid fuel passage 12, an atomization air injection port 18 which injects an atomization air "b" around the liquid fuel injection port 17 from the atomization air passage 13 so that the liquid fuel "a" becomes an atomized state, and a coal gasification fuel injection port 20 having a swirler 19 which injects a coal gasification fuel "c" from the coal gasification fuel passage 14 in a rotating state.

During the gas turbine operation, the coal gasification fuel "c" or the liquid fuel "a" in an air atomized state is selectively injected into the combustor 5 from the fuel nozzle 5 by a known means, and a combustion air "d" is supplied into the combustor liner 4 from a gas turbine compressor (not shown) via the combustion air passage 3 to thereby start the combustion. Then, a combustion gas 21 thus generated is supplied to a gas turbine (not shown) via the transition piece 6.

Meanwhile, as described above, conventionally, when the gas turbine is in the stage of start-up, stop or during a load dump, a combustion operation using only the liquid fuel "a" is carried out, and at this time, the supply of the coal gasification fuel "c" is stopped. For this reason, an internal pressure of the coal gasification fuel passage 14 for supplying the coal gasification fuel "c" becomes lower than that of the combustor liner 4 in which the combustion gas 21 generated by the combustion of the liquid fuel "a" is filled. Thus, as shown by an arrow "e" in FIG. 11, by the differential pressure, there happens a phenomenon such that the combustion gas 21 conversely flows into the coal gasification fuel passage 14 from the combustor liner 4 side.

Even in the case where no differential pressure is caused, by a mere change in a kinetic (dynamic) pressure of the combustion gas 21, a pressure change of the combustor 1 or the like, there may be the case where the combustion gas 21 conversely flows into the coal gasification passage 14.

The conversely flowing phenomenon of the combustion gas 21 as described above is a factor of damaging the fuel nozzle 5, hinders the gas turbine operation, and further, makes short the life of combustor. For this reason, various problems are caused in an operation, economics or the like.

SUMMARY OF THE INVENTION

An object of the present invention is to eliminate defects or drawbacks encountered in the prior art described above and to provide a coal gasification fuel combined cycle power generation plant or facility and a method of operating the same which can prevent a combustion gas from conversely flowing into a coal gasification fuel supply passage during a liquid fuel operation and can avoid damaging of a fuel nozzle so as to stably carry out a gas turbine operation and to improve a usable life of the combustor.

This and other objects can be achieved according to the present invention by providing, in one aspect, a coal gasification combined cycle power generation plant including a gas turbine system, a fuel supply system, an air supply system and an exhaust gas system, which are operatively connected to each other, the gas turbine system including a combustor provided with means for selectively burning a coal gasification fuel obtained by gasifying a coal and a liquid fuel atomized by an atomization air and a gas turbine to which a combustion gas generated in the combustor is supplied, the combustor being provided with a fuel nozzle, a liner disposed inside the combustor and a combustion air passage formed between the liner and an outer casing of the combustor, the fuel supply system being provided with a liquid fuel supply passage for the combustor through the fuel nozzle, an atomization air supply passage for the combustor through the fuel nozzle and a coal gasification fuel supply passage for the combustor through the fuel nozzle, all of the supply passages being arranged so as to be adjacent to each other, the atomization air supply passage being provided with an outlet portion to which a branching outlet port for injecting the atomization air toward an outlet portion of the coal gasification supply passage is formed.

In another aspect, there is provided a coal gasification combined cycle power generation plant including a gas turbine system, a fuel supply system, an air supply system and an exhaust gas system, which are operatively connected to each other, the gas turbine system including a combustor provided with means for selectively burning a coal gasification fuel obtained by gasifying a coal and a liquid fuel atomized by an atomization air and a gas turbine to which a combustion gas generated in the combustor is supplied, the combustor being provided with a fuel nozzle, a liner disposed inside the combustor and a combustion air passage formed between the liner and an outer casing of the combustor, the fuel supply system being provided with a liquid fuel supply passage for the combustor through the fuel nozzle, an atomization air supply passage for the combustor through the fuel nozzle and a coal gasification fuel supply passage for the combustor through the fuel nozzle, all of the supply passages being arranged so as to be adjacent to each other, the atomization air supply passage being provided with a passage wall portion and an outlet portion and a blow-out hole for blowing out the atomization air to the coal gasification fuel supply passage in a vicinity of the outlet portion.

In a further aspect, there is provided a coal. gasification combined cycle power generation plant including a gas turbine system, a fuel supply system, an air supply system and an exhaust gas system, which are operatively connected to each other, the gas turbine system including a combustor provided with means for selectively burning a coal gasification fuel obtained by gasifying a coal and a liquid fuel atomized by an atomization air and a gas turbine to which a combustion gas generated in the combustor is supplied, the combustor being provided with a fuel nozzle, a liner disposed inside the combustor and a combustion air passage formed between the liner and an outer casing of the combustor, the fuel supply system being provided with a liquid fuel supply passage for the combustor through the fuel nozzle, an atomization air supply passage for the combustor through the fuel nozzle and a coal gasification fuel supply passage for the combustor through the fuel nozzle, all of the supply passages being arranged so as to be adjacent to each other, the combustion air passage being provided with an outlet portion through which a combustion air from a compressor of the gas turbine system is blown toward the liner of the combustor and the outlet portion is provided with a combustion air injecting portion so as to inject a combustion air toward an outlet portion of the coal gasification fuel supply passage.

In a still further aspect, there is provided a coal gasification combined cycle power generation plant including a gas turbine system, a fuel supply system, an air supply system and an exhaust gas system, which are operatively connected to each other, the gas turbine system including a combustor provided with means for selectively burning a coal gasification fuel obtained by gasifying a coal and a liquid fuel atomized by an atomization air and a gas turbine to which a combustion gas generated in the combustor is supplied, the combustor being provided with a fuel nozzle, a liner disposed inside the combustor and a combustion air passage formed between the liner and an outer casing of the combustor, the fuel supply system being provided with a liquid fuel supply passage for the combustor through the fuel nozzle, an atomization air supply passage for the combustor through the fuel nozzle and a coal gasification fuel supply passage for the combustor through the fuel nozzle, all of the supply passages being arranged so as to be adjacent to each other, the combustion air passage being communicated with the coal gasification fuel supply passage so as to supply a combustion air to the coal gasification fuel supply passage from the combustion air passage and a control means for controlling an air flow rate in the coal gasification fuel supply passage is provided for the combustion air passage.

In a preferred embodiment, the coal gasification combined cycle power generation plant further includes a control unit provided for the coal gasification fuel supply passage, the control unit, which may include a normal operation flow control means for controlling a flow rate in a coal gasification fuel operation and an auxiliary flow control means for controlling a flow rate of a little amount of the coal gasification fuel supplied in a use of the liquid fuel. A temperature detector may be further provided for the fuel nozzle for injecting the coal gasification fuel to the combustor and a further control means for controlling the auxiliary flow control means which operates in a case where the temperature detector detects a temperature more than a fixed temperature, and the further control means is set so as to secure a minimum flow rate for preventing the coal gasification fuel from conversely flowing into the fuel nozzle.

The above object can be also achieved by providing, in a still further aspect, a method of operating a coal gasification combined cycle power generation plant including a gas turbine system, a fuel supply system, an air supply system and an exhaust gas system, which are operatively connected to each other, the gas turbine system including a combustor provided with means for selectively burning a coal gasification fuel obtained by gasifying a coal and a liquid fuel atomized by an atomization air and a gas turbine to which a combustion gas generated in the combustor is supplied, the combustor being provided with a fuel nozzle, a liner disposed inside the combustor and a combustion air passage formed between the liner and an outer casing of the combustor, the fuel supply system being provided with a liquid fuel supply passage for the combustor through the fuel nozzle, an atomization air supply passage for the combustor through the fuel nozzle and a coal gasification fuel supply passage for the combustor through the fuel nozzle, all of the supply passages being arranged so as to be adjacent to each other, the operation method comprising the steps of:

carrying out an operation by the combustion of the liquid fuel during a start-up of the gas turbine;

carrying out an operation by the combustion of the coal gasification fuel after a predetermined time elapsed thereafter; and supplying an incomplete coal gasification fuel from the coal gasification fuel supply passage to the combustor through the fuel nozzle until a coal gasification fuel operation from the start-up of the gas turbine.

In a still further aspect, there is provided a method of operating a coal gasification combined cycle power generation plant including a gas turbine system, a fuel supply system, an air supply system and an exhaust gas system, which are operatively connected to each other, the gas turbine system including a combustor provided with means for selectively burning a coal gasification fuel obtained by gasifying a coal and a liquid fuel atomized by an atomization air and a gas turbine to which a combustion gas generated in the combustor is supplied, the combustor being provided with a fuel nozzle, a liner disposed inside the combustor and a combustion air passage formed between the liner and an outer casing of the combustor, the fuel supply system being provided with a liquid fuel supply passage for the combustor through the fuel nozzle, an atomization air supply passage for the combustor through the fuel nozzle and a coal gasification fuel supply passage for the combustor through the fuel nozzle, all of the supply passages being arranged so as to be adjacent to each other, the operation method comprising the steps of:

carrying out an operation by the combustion of the liquid fuel during a start-up of the gas turbine;

carrying out an operation by the combustion of the coal gasification fuel after a predetermined time elapsed thereafter;

changing over the coal gasification fuel operation into an operation by the combustion of the liquid fuel in a case where a gas turbine load becomes less than a fixed load; and supplying the coal gasification fuel of a fixed amount from the coal gasification fuel supply passage to the combustor through the fuel nozzle after a change-over is made from a combustion operation by the coal gasification fuel to a combustion operation by the liquid fuel.

In a still further aspect, there is provided a method of operating a coal gasification combined cycle power generation plant including a gas turbine system, a fuel supply system, an air supply system and an exhaust gas system, which are operatively connected to each other, the gas turbine system including a combustor provided with means for selectively burning a coal gasification fuel obtained by gasifying a coal and a liquid fuel atomized by an atomization air and a gas turbine to which a combustion gas generated in the combustor is supplied, the combustor being provided with a fuel nozzle, a liner disposed inside the combustor and a combustion air passage formed between the liner and an outer casing of the combustor, the fuel supply system being provided with a liquid fuel supply passage for the combustor through the fuel nozzle, an atomization air supply passage for the combustor through the fuel nozzle and a coal gasification fuel supply passage for the combustor through the fuel nozzle, all of the supply passages being arranged so as to be adjacent to each other, the operation method comprising the steps of:

carrying out an operation by the combustion of the liquid fuel during a start-up of the gas turbine;

carrying out an operation by the combustion of the coal gasification fuel after a predetermined time elapsed thereafter;

changing over the coal gasification fuel operation into an operation by the combustion of the liquid fuel at the same time with a load dump in a case of a load dump; and supplying the coal gasification fuel of a fixed amount from the coal gasification fuel passage to the combustor through the a fuel nozzle after a change-over is made from a combustion operation by the coal gasification fuel to a combustion operation by the liquid fuel.

The above operation methods may further comprise the step of controlling a flow rate in a coal gasification operation, the controlling step may including normal controlling of a flow rate in a coal gasification fuel operation and auxiliary controlling of a flow rate of a little amount of the coal gasification fuel supplied in a use of the liquid fuel.

The auxiliary flow control is controlled, in a case where a temperature more than a fixed temperature is detected, so as to secure a minimum flow rate for preventing the coal gasification fuel from conversely flowing into the fuel nozzle.

According to the characters or subject features of the present invention mentioned above, it becomes possible to prevent the combustion gas from conversely flowing into the coal gasification fuel supply passage during the liquid fuel operation. Therefore, the fuel nozzle is prevented from being damaged, whereby the gas turbine operation can be stably carried out and the usable life of the combustor can be effectively increased.

The nature and further detailed features of the present invention will be made more clear from the following descriptions made with reference to the accompanying drawings.

DESCRIPTION OF THE PREFERRED EMBODIMENTS

Figure 2:
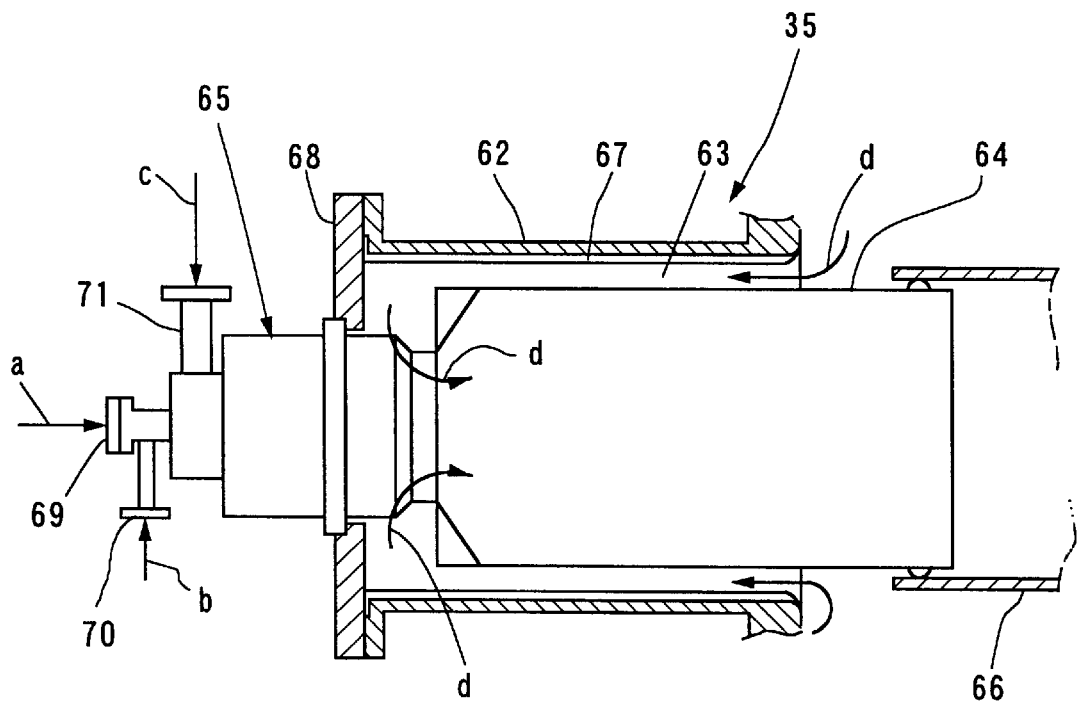
FIG. 2 is a sectional view showing a structure of a gas turbine combustor in the first embodiment.
Figure 3:
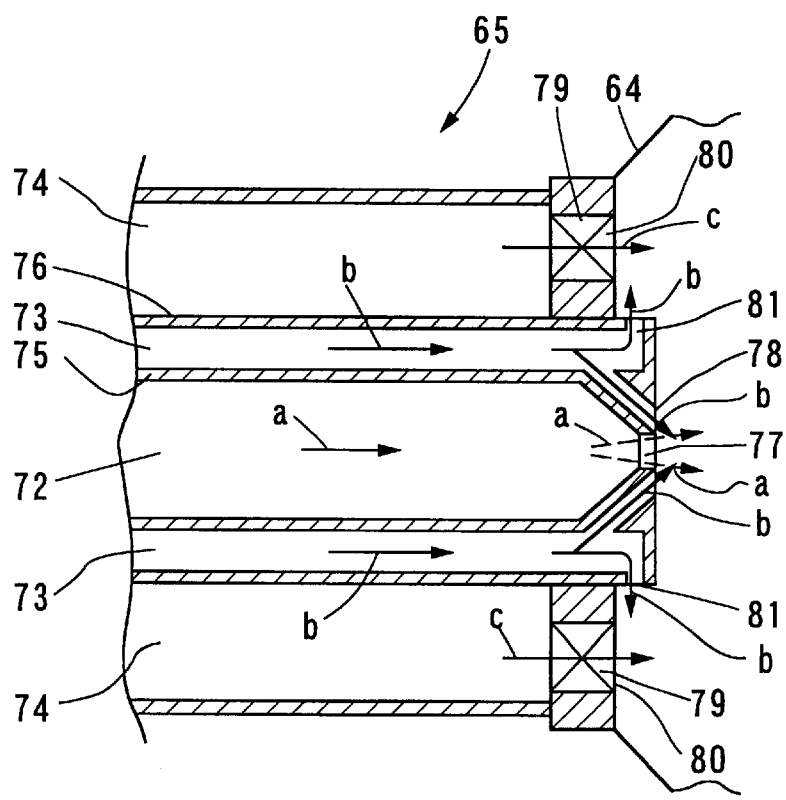
FIG. 3 is a partially enlarged view of the gas turbine combustor shown in FIG. 2.

Embodiments of the present invention will be described hereunder with reference to the accompanying drawings.
First embodiment (FIG. 1 to FIG. 3)

Figure 1:
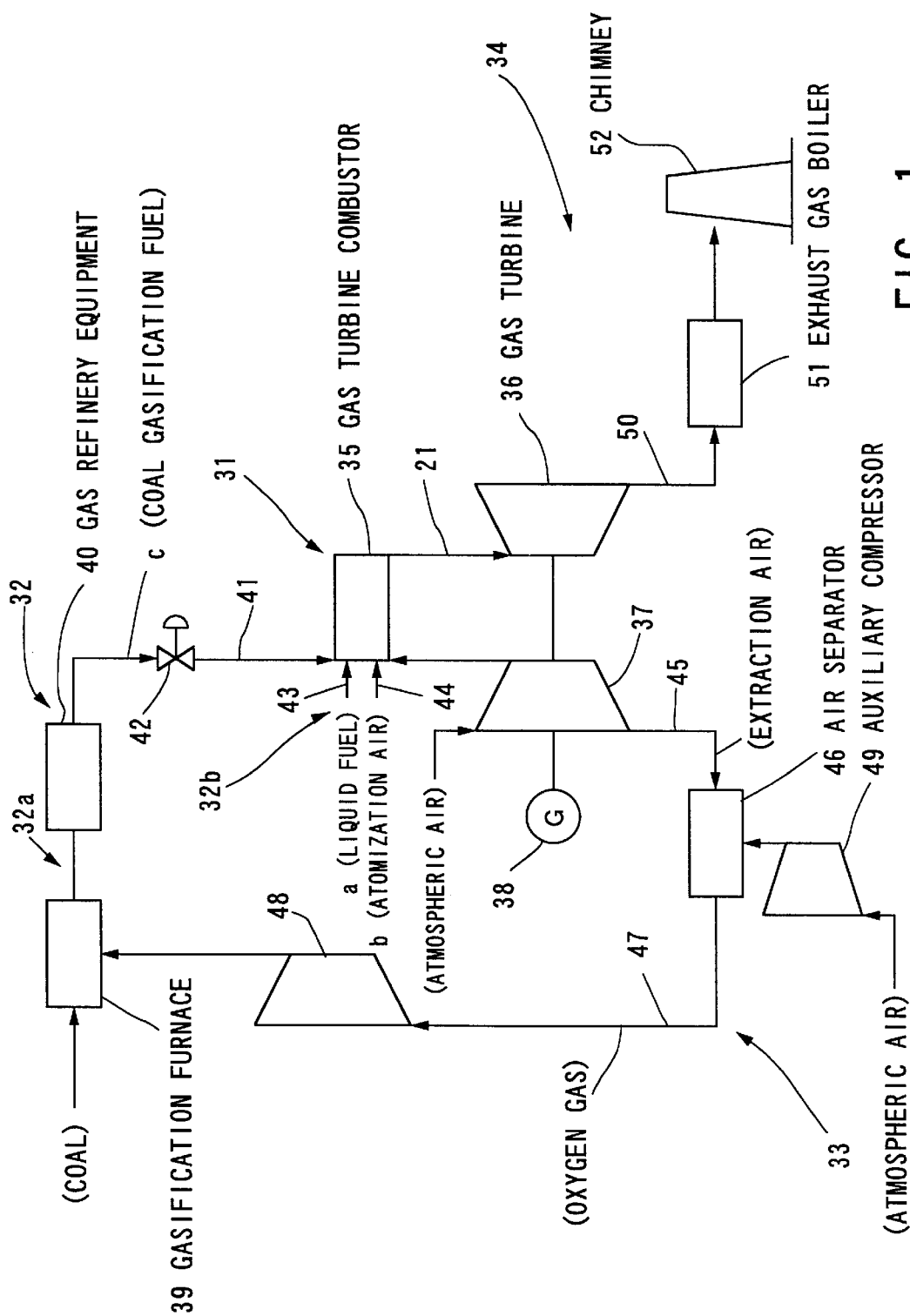
FIG. 1 shows a system diagram of a coal gasification combined cycle power generation plant according to a first embodiment of the present invention.

FIG. 1 is a system diagram showing the whole construction of a coal gasification combined cycle power generation plant of facility of the first embodiment of the present invention.

With reference to FIG. 1, the coal gasification combined cycle power generation plant of this first embodiment comprises a gas turbine system 31, a fuel supply system 32, an air supply system 33 and a an exhaust gas system 34, which are broadly classified and operatively connected to each other.

The gas turbine system 31 includes a combustor 35 which can selectively burn the coal gasification fuel "c" and the liquid fuel "a", a gas turbine 36 which is driven by a combustion gas generated by the combustor 35, a gas turbine compressor 37 which is provided coaxially with the gas turbine 36, and a generator 38. The selection of the coal gasification fuel and the liquid fuel is performed by a known means under the monitoring of the liquid fuel from the combustion start time.

The fuel supply system 32 is composed of two systems, that is, a coal gasification fuel supply system 32a and a liquid fuel supply system 32b. The coal gasification fuel supply system 32a includes a gasification furnace 39 for gasifying coal, and a gas refinery equipment 40 for purifying a coal gas refined by the gasification furnace 39. Further, the coal gasification fuel supply system 32a supplies the refined coal gasification fuel "c" to the combustor 35 via a coal gasification fuel pipe 41. The coal gasification fuel pipe 41 is provided with a flow control valve 42 which functions as a flow control unit.

The liquid fuel supply system 32b selectively supplies the liquid fuel "a" and the atomization air "b" from a liquid fuel supply source (not shown) and a atomization air supply source (not shown), and the coal gasification fuel "c" to the combustor 35 via a liquid fuel pipe 43 and an air pipe 44.

The air supply system 33 is a system for supplying oxygen required for coal gasification in the gasification furnace 39. Further, the air supply system 33 has an extraction pipe 45 for extracting a part of compressed air from a gas turbine compressor 37, an air separator 46 which is connected to the ex traction pipe 45 and generates oxygen, and an oxygen gas compressor 48 connected to the air separator 46 via an oxygen gas pipe 47. Further, in the air supply system 33, there is provided an auxiliary compress or 49 for generating oxygen used in the gasification furnace 39 before the gas turbine compressor 37 is operated.

The exhaust gas system 34 includes an exhaust gas pipe 50 connected to the gas turbine 36, an exhaust gas boiler 51 connected to the exhaust gas pipe 50 and a chimney stack 52.

In the case of operating the coal gasification combined cycle power generation plant constructed in the. manner described above, first, the liquid fuel "a" and the atomization air "b" are supplied to the combustor 35 to make combustion, and thereby, the gas turbine 36 starts up. With the start-up of the gas turbine 36, the coal gasification fuel is generated in the gasification furnace 39. In this case, during the start-up of the gas turbine 36, at first, in the gasification furnace 39, a compressed air from the auxiliary compressor 49 or oxygen separated from the compressed air by the air separator 46 is used. After the gas turbine 36 starts up, the pressurized air by the gas turbine compressor 37 or oxygen separated from the pressurised air by the air separator 46.

In the operation stage until about one-fourth (¼) load of the gas turbine 36 from the start-up operation, only incomplete coal gasification fuel having a low calorific value is generated in the gasification furnace 39, and for this reason, the liquid fuel operation is continued. With the rise of load, a complete coal gasification fuel is generated in the gasification furnace 39, and thereafter, a change-over is made from the liquid fuel combustion operation to a coal gasification fuel operation, and then, only coal gasification fuel operation is carried out by a gas turbine rating point. Thereafter, in the case where the gas turbine 36 is in a load dump state or when the gas turbine 36 is stopped, a change-over is again made from the coal gasification fuel operation to the liquid fuel operation.

Next, the structure of the combustor 35 used in the coal gasification combined cycle power generation plant will be explained with reference to FIG. 2 and FIG. 3.

As shown in FIG. 2, a combustor 35 is constructed in a manner that a combustor liner 64 used as an inner cylindrical casing is inserted into an outer cylindrical casing 62 with a combustion air passage 63 defined therebetween, a fuel nozzle 65 is provided at an end portion on an upstream side of the combustor liner 64, and a transition piece 66 is connected to a downstream side of the combustor liner 64. An inner circumferential portion of the outer cylindrical casing 62 is provided with a flow sleeve 67 which covers the combustion air passage 63 and functions as an air guide.

The fuel nozzle 65 has a multiple cylindrical shape fixed to a head plate 68 provided on the end portion of the outer cylindrical casing 62. Further, the fuel nozzle 65 is provided with a liquid fuel supply port 69 for supplying a liquid fuel "a", an atomization air supply port 70 for supplying an atomization air for atomizing the liquid fuel "a", and a coal gasification fuel supply port 71 for supplying a coal gasification fuel "c", at its outer end situated on the outer side of the outer cylindrical casing 62.

As shown in FIG. 3, the fuel nozzle 65 is formed with a liquid fuel passage 72 for passing the liquid fuel "a" at the center portion on the internal side thereof, an atomization air passage 73 for passing an atomization air "b" of the liquid fuel at the outer side of the liquid fuel passage 72, and further, a coal gasification fuel passage 74 for passing the coal gasification fuel "c" at the outer side of the atomization air passage 73. These passages 72, 73 and 74 are arranged side-by-side in a manner of being partitioned by cylindrical walls 75 and 76 and communicate with the liquid fuel supply port 69, the atomization air supply port 70 and the coal gasification fuel supply port 71, respectively.

Moreover, an inner end portion of the fuel nozzle 65 facing the inside of the combustor liner 64 is provided with a liquid fuel injection port 77 for injecting the liquid fuel "a" from the liquid fuel passage 72, an atomization air injection port 78 which injects the atomization air "b" around the liquid fuel injection port 77 from the atomization air passage 73 so that the liquid fuel "a" becomes an atomized state, and a coal gasification fuel injection port 80 having a swirler 79 which injects the coal gasification fuel "c" from the coal gasification fuel passage 74 in a rotating state.

As described above, the fuel nozzle 65 for injecting a fuel to the combustor 35 is provided with the liquid fuel passage 72, the atomization air passage 73 and the coal gasification fuel passage 74, which are arranged so as to be adjacent to each other. In this embodiment, a branching outlet port 81 for injecting the atomization air "b" toward the coal gasification injection port 80 situated on the outside is provided at a position of the injection port 78 which is an outlet portion of the atomization air passage 73. A plurality of the branching outlet ports 81 for the atomization air are formed along a circumferential direction of the fuel nozzle 65 and continuously inject the atomization air "b" toward the outside of the swirler 79 of the coal gasification fuel injection port 80 so that an air film is formed on the coal gasification fuel injection port 80.

Therefore, during the start-up state of the gas turbine 36, during the load dump state or during the interruption of the gas turbine, in the case of carrying out an operation in accordance with the combustion by only the liquid fuel "a", even if the coal gasification fuel "c" is not supplied to the coal gasification fuel passage 74, and as a result, the internal pressure of the coal gasification fuel passage 74 is lower than the combustion gas pressure of the combustor 35, the coal gasification fuel passage 74 is shielded from the interior of the combustor liner 64 by an air film formed by a part of the atomization air "b" injected from the branching outlet port 81 for the atomization air "b". Therefore, the combustion gas does not conversely flow into the coal gasification fuel passage 74.

Furthermore, during the operation made by using the coal gasification fuel "c", the supply of the liquid fuel "a" and the atomization air "b" is stopped, and therefore, there is no hindrance in injection and combustion of the coal gasification fuel "c".

According to the first embodiment mentioned above, it is possible to securely prevent the combustion gas from conversely flowing into the coal gasification fuel passage 74 during the liquid fuel operation. Therefore, the gas turbine operation can be stably carried out without damaging the fuel nozzle 65 and the life of the combustor can be made long. As a result, great advantage is obtainable in both the viewpoints of operation and economics as compared with the conventional power generation plant or facility.

Figure 4:
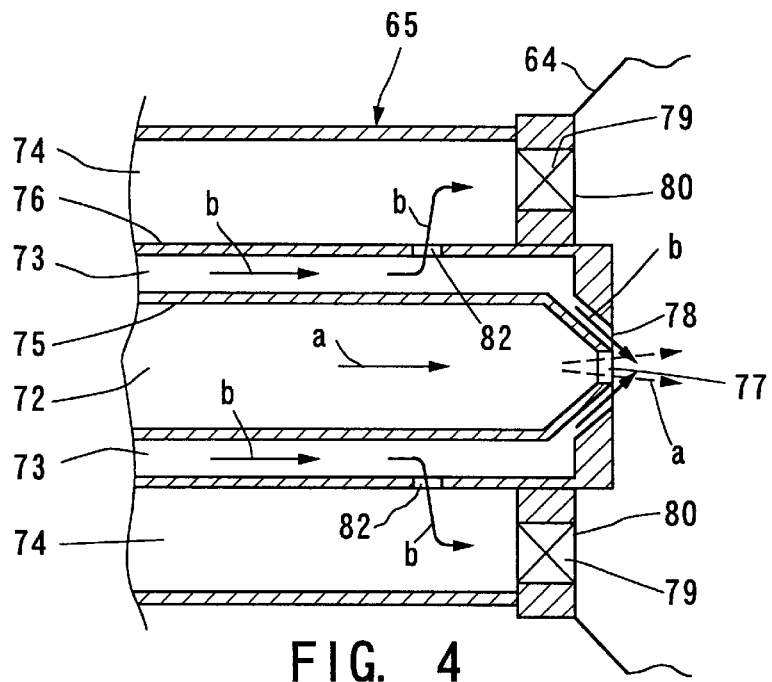
FIG. 4 shows a sectional view of a gas turbine combustor according to a second embodiment of the present invention.

Second Embodiment (FIG. 4)

FIG. 4 is an enlarged sectional view showing a fuel nozzle 65 of a combustor 35 of a coal gasification combined cycle power generation plant according to a second embodiment of the present invention.

As shown in FIG. 4, in this second embodiment, the fuel nozzle 65 for injection a fuel to the combustor 35 is provided with a liquid fuel passage 72, an atomization air passage 73 and a coal gasification fuel passage 74, which are arranged so as to be adjacent to each other. Further, the fuel nozzle 65 is provided with a blowout hole 82 for blowing out the atomization air to the coal gasification fuel passage 74 at a passage wall 76 in the vicinity of the outlet portion of the atomization air passage 73. A plurality of the blowout holes 82 for atomization air are formed along the circumferential direction of the fuel nozzle 65 and are individually opened in the vicinity of the coal gasification fuel passage injection port 80. For instance, the atomization air is continuously blown out toward the inner surface of the swirler 79, and thereafter, the atomization air "b" is injected from the coal gasification fuel outlet port 80 into the combustor liner 64. Further, the other construction is the substantially same as the aforesaid first embodiment, and therefore, the same reference numbers are used to designate the portions corresponding to those shown in FIG. 3, and the details thereof are omitted herein.

In this second embodiment, during the start-up state of the gas turbine 36, during the load dump state or during the interruption of the gas turbine, in the case of carrying out an operation in accordance with the combustion by only liquid fuel "a", even if the coal gasification fuel is not supplied to the coal gasification fuel passage 74, and as a result, the internal pressure of the coal gasification fuel passage 74 is lower than the combustion gas pressure of the combustor 35, the atomization air is blown out from the blowout hole to the coal gasification fuel passage 74, so that coal gasification fuel passage 74 becomes a pressurized state. Therefore, the combustion gas does not conversely flow into the coal gasification fuel passage 74.

Furthermore, during the operation made by using the coal gasification fuel, the supply of the liquid fuel and the atomization air is stopped, and therefore, there is no hindrance in injection and combustion of the coal gasification fuel.

According to the second embodiment mentioned above, it is possible to securely prevent the combustion gas from conversely flowing into the coal gasification fuel passage 74 during the liquid fuel operation. Therefore, the gas turbine operation can be stably carried out without damaging the fuel nozzle 65 and the life of the combustor can be made long. Accordingly, great advantage is obtainable in both the viewpoints of operation and economics as compared with the conventional plant or facility.

Figure 5:
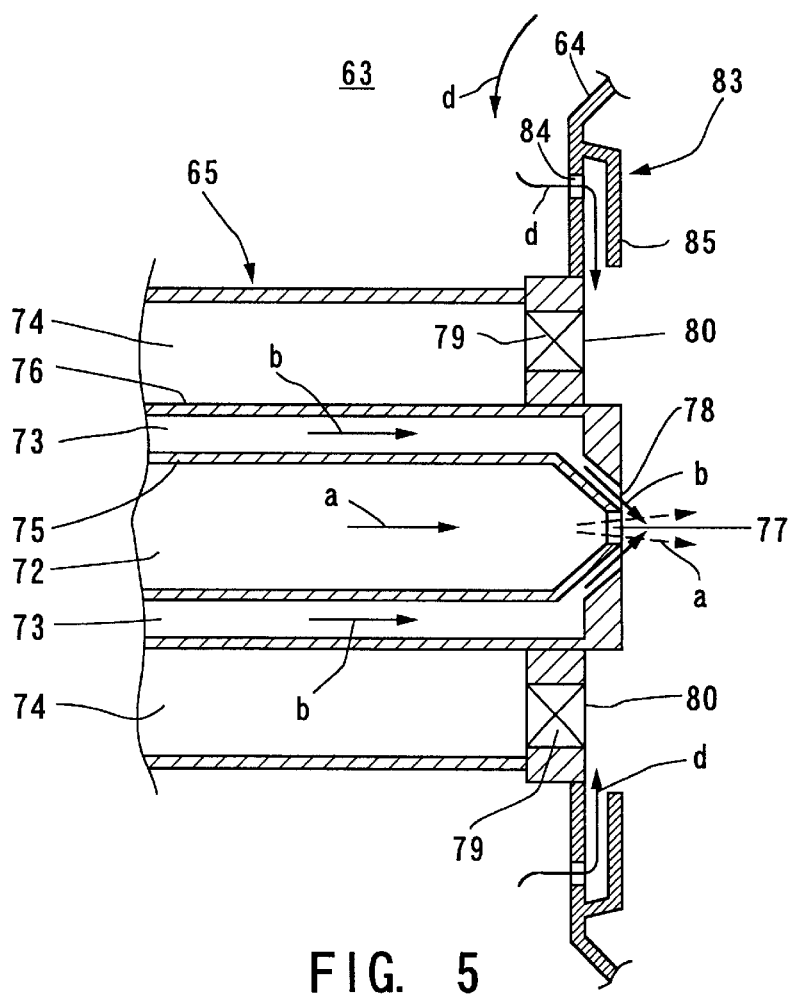
FIG. 5 shows a sectional view of a gas turbine combustor according to a third embodiment of the present invention.

Third Embodiment (FIG. 5)

FIG. 5 is an enlarged sectional view showing a fuel nozzle 65 of a combustor 35 of a coal gasification combined cycle power generation plant according to a third embodiment of the present invention.

As shown in FIG. 5, in this third embodiment, a combustion air injecting portion 83 for injecting a combustion air "d" toward an outlet portion of the coal gasification fuel passage 74 is provided at an outlet portion of the combustion air passage 63 which blows the combustion air "d" from the gas turbine compressor 37 (see FIG. 1) into the combustor liner 64. The combustion air injecting portion 83 is composed of, for example, a hole 84 which is formed at an end wall 64a on the fuel nozzle 65 side of the combustor liner 64, and a guide member 85 which is disposed on the outer peripheral side of the hole 84 and projects to the inner face of the end wall 64a of the combustor liner 64. The combustion air is continuously injected toward the outer side of the swirler 79 of the coal gasification fuel injection port 80 so that an air film is formed in the coal gasification fuel port 80.

Therefore, in this third embodiment, during the start-up state of the gas turbine 36, during the load dump state or during the interruption of the gas turbine, in the case of carrying out an operation in accordance with the combustion by only the liquid fuel "a", even if the coal gasification fuel "c" is not supplied to the coal gasification fuel passage 74. As a result, the internal pressure of the coal gasification fuel passage 74 is lower than the combustion gas pressure of the combustor 35, the coal gasification fuel passage 74 is shielded from the interior of the combustor liner 64 by the air film formed by the combustion air "d". Therefore, the combustion gas does not conversely flow into the coal gasification fuel passage 74.

According to the third embodiment mentioned above, it is possible to securely prevent the combustion gas from conversely flowing into the coal gasification fuel passage 74 during the liquid fuel operation. Therefore, the gas turbine operation can be stably carried out without damaging the fuel nozzle 65, and the life of the combustor can be made long. Accordingly, great advantage is obtainable in both the viewpoints of operation and economics in the same manner as that of the first embodiment.

Figure 6:
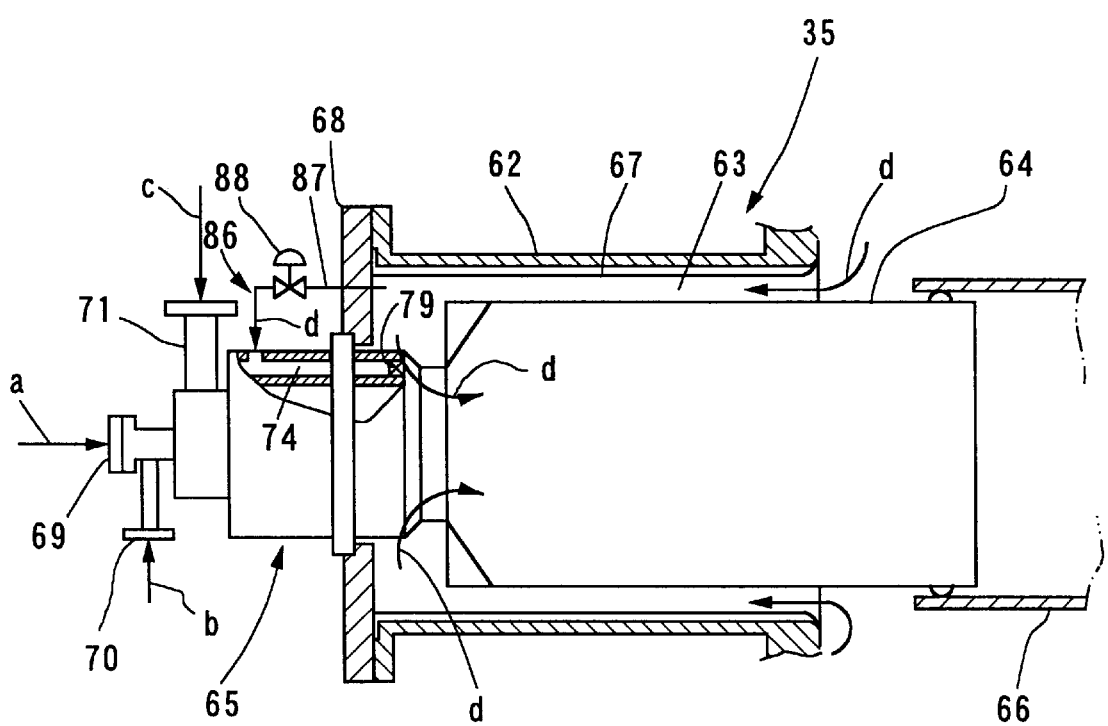
FIG. 6 shows a sectional view of a gas turbine combustor according to a fourth embodiment of the present invention.

Fourth Embodiment (FIG. 6)

FIG. 6 is an enlarged sectional view showing a combustor 35 of a coal gasification combined cycle power generation plant according to a fourth embodiment of the present invention.

As shown in FIG. 6, in this fourth embodiment, a combustion air injecting portion 86 for injecting a combustion air "d" toward an outlet portion of the coal gasification fuel passage 74 is provided at an outlet portion of the combustion air passage 63 which blows the combustion air "d" from the gas turbine compressor 37 into the combustor liner 64. The combustion air injecting portion 86 is constructed in a manner that the combustion air passage 63 and the coal gasification fuel passage 74 communicates with each other by means of a pipe 87 penetrating through the head plate 68, and the pipe 87 is provided with a control valve 88.

With the construction as described above, the combustion air "d" is supplied to the coal gasification fuel passage 74 via the pipe 87 provided on the head plate 68. Thus, in the case where the coal gasification fuel "c" is not supplied to the coal gasification fuel passage 74, the control valve 88 is opened so that the combustion air "d" is blown into the combustor liner 64 from the coal gasification fuel passage 74 via the swirler 79. Thus, it becomes possible to prevent the combustion gas from conversely flowing into the coal gasification fuel passage 74 as like as in the above-mentioned embodiments.

Moreover, in this fourth embodiment, at the time when the supply of the coal gasification fuel "c" is started, in the case where a pressure of the combustion air "d" side is high, the combustion air "d" is mixed with the coal gasification fuel "c" in the coal gasification fuel passage 74, and then, becomes a premixing lean fuel. For this reason, there is the possibility that combustion happens in the coal gasification fuel passage 74. Further, conversely, in the case where the pressure of the coal gasification fuel "c" is higher than the pressure of the combustion air "d", there is the possibility that the coal gasification fuel "c" flows from the coal gasification fuel passage 74 into the combustion air passage 63 side.

Considering the above situation, in this fourth embodiment, the control valve 88 provided on the pipe 87 is closed during the coal gasification fuel operation so as to make a closed state. Further, a check valve (not shown) may be used so as to prevent the combustion air from conversely flowing to the combustion air passage 63 side.

In the fourth embodiment mentioned above, it is possible to securely prevent the combustion gas from conversely flowing into the coal gasification fuel passage 74 during the liquid fuel operation. Thus, the same operations and effects as those of the respective embodiments mentioned above can be obtained.

Figure 7:
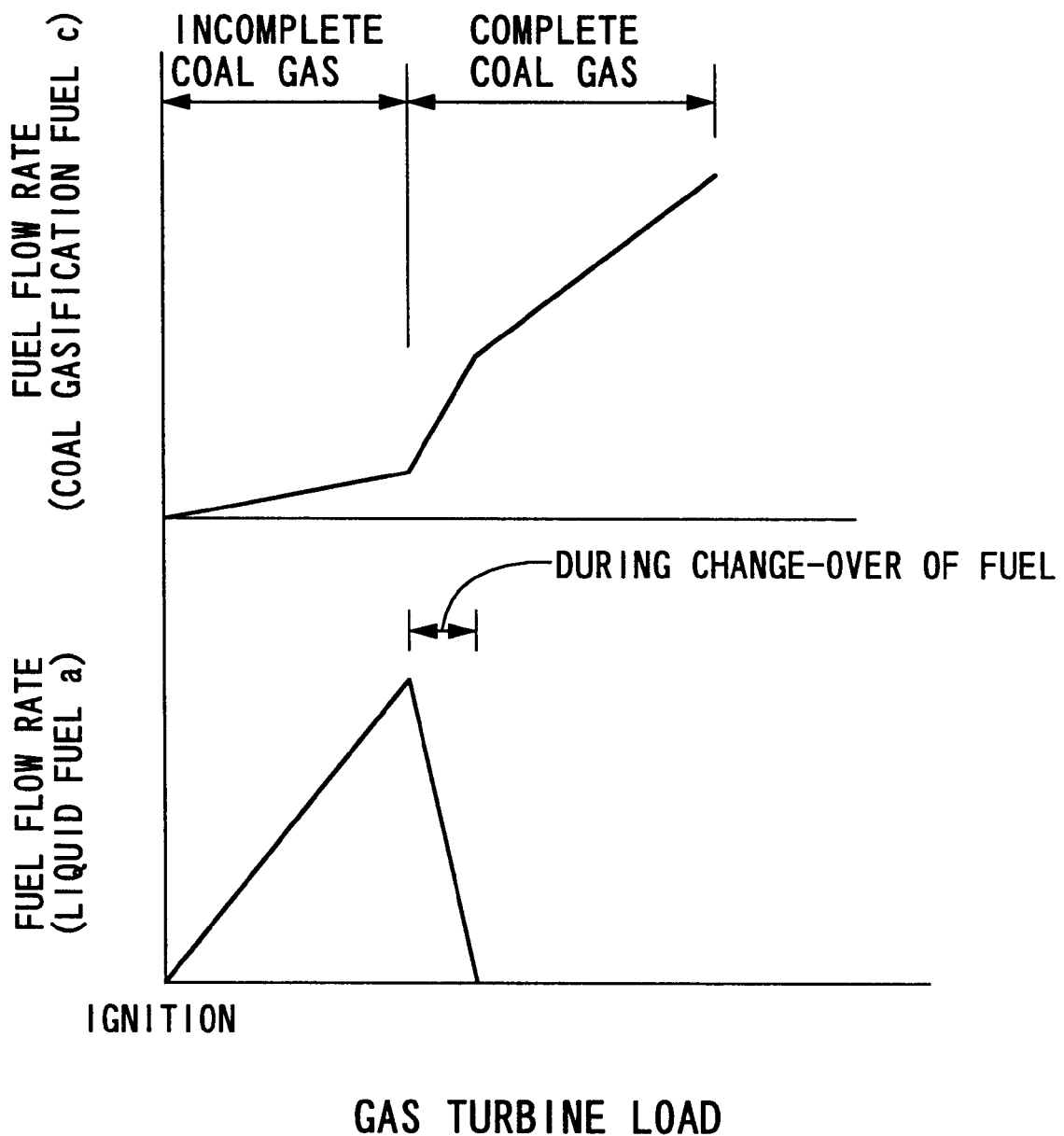
FIG. 7 is a graph showing a fuel flow characteristic to explain a fifth embodiment of the present invention.

Fifth Embodiment (FIG. 1 and FIG. 7)

This fifth embodiment shows an operating method of the coal gasification fuel combined cycle power generation plant according to the present invention. In particular, an incomplete coal gasification fuel is supplied to the coal gasification fuel passage, and thereby, there is provided an operating method of preventing the combustion gas from conversely flowing into the coal gasification fuel passage during the liquid fuel operation until the coal gasification fuel operation from the gas turbine start-up.

More specifically, for example, in the case of operating the coal gasification fuel combined cycle power generation plant shown in FIG. 1, an operation is made by the combustion by only the liquid fuel "a" until the gas turbine load becomes about one fourth (¼) load from the start-up of the gas turbine 36, and thereafter, the operation is changed into an operation by a complete coal gasification fuel "c". The coal gasification fuel generated in the gasification furnace 39 until the load operation of the aforesaid load is incomplete and is not burned.

Conventionally, the supply of the incomplete coal gasification fuel has been stopped during the liquid fuel operation until the gas turbine load becomes one fourth (¼) load from the gas turbine start-up. However, in this fifth embodiment, during the liquid fuel operation, the incomplete coal gasification fuel "c" is supplied from the coal gasification fuel passage to the combustor 35 via the fuel nozzle 35.

FIG. 7 is a graph showing a fuel flow rate to explain the operating method mentioned above and taking a flow rate of liquid fuel and coal gasification fuel as an ordinate and taking a gas turbine load as an abscissa.

As shown in FIG. 7, in this fifth embodiment, the incomplete coal gasification fuel generated in the gasification furnace 39 is gradually supplied to the combustor together with a liquid fuel whose supplying flow rate gradually increases from the start-up. In other words, with the increase of the liquid fuel flow rate, the combustion gas increases, and then, the internal pressure of the combustor liner is made high. With the high pressure the combustor liner, the supply of incomplete coal gasification fuel is increased so that an internal pressure of the coal gasification fuel passage is made high. According to this function, it is possible to prevent the combustion gas from conversely flowing into the coal gasification fuel passage.

The operation is changed into a coal gasification fuel operation at the time when the complete coal gasification fuel "c" is generated in the gasification furnace 39, and then, from this set time, the flow rate of the liquid fuel is gradually reduced. After that, the flow rate of the coal gasification fuel is increased until the rating load, and thereafter, the operation is carried out at a fixed flow rate.

According to the operating method of this embodiment, in particular, the fuel nozzle has no need of change in its structure. Further, only through the fuel supply control, it becomes possible to securely prevent the combustion gas from conversely flowing into the coal gasification fuel passage, as like as in the above-mentioned embodiments. Therefore, the gas turbine operation can be stably carried out, and the life of the combustor can be made long. As a result, great advantage is obtainable in both the viewpoints of operation and economics of the power generation plant or facility.

Sixth Embodiment (FIG. 1)

This sixth embodiment shows an operating method of the coal gasification fuel power generation plant of the present invention. There is provided an operating method of preventing the combustion gas from conversely flowing into the coal gasification fuel passage 74 by supplying the coal gasification fuel to the coal gasification fuel passage during the liquid fuel operation in the case where a load becomes lower than a fixed load as the gas turbine stop operation.

More specifically, in the case of operating the coal gasification fuel combined cycle power generation plant shown in FIG. 1, as described in the fifth embodiment mentioned above, after the gas turbine load becomes about one fourth (¼) load, an operation using the complete coal gasification fuel "c" is carried out, and after that, the flow rate of the coal gasification fuel "c" is increased until the rating load, and thereafter, the operation is carried out at a fixed flow rate. In the case where the gas turbine load becomes lower than a fixed load as the case that the gas turbine is stopped, it is difficult to use the coal gasification fuel "c". For this reason, the operation is changed into an operation made by the combustion of the liquid fuel "a", and after the change-over, the supply of the coal gasification fuel "c" has been stopped in the conventional manner.

However, in this sixth embodiment, even during the liquid fuel operation, the coal gasification fuel is supplied to the combustor from the coal gasification fuel passage via the fuel nozzle.

According to the operating method of this embodiment, in particular, the fuel nozzle and the like have no need of change in their structure. Further, through only the fuel supply control, it becomes possible to securely prevent the combustion gas from conversely flowing into the coal gasification fuel passage as like as in the above-mentioned embodiments. Therefore, the gas turbine operation can be stably carried out, and the life of the combustor can be made long. As a result, great advantage is obtainable in both the viewpoints of operation and economics of the power generation plant or facility.

Figure 8:
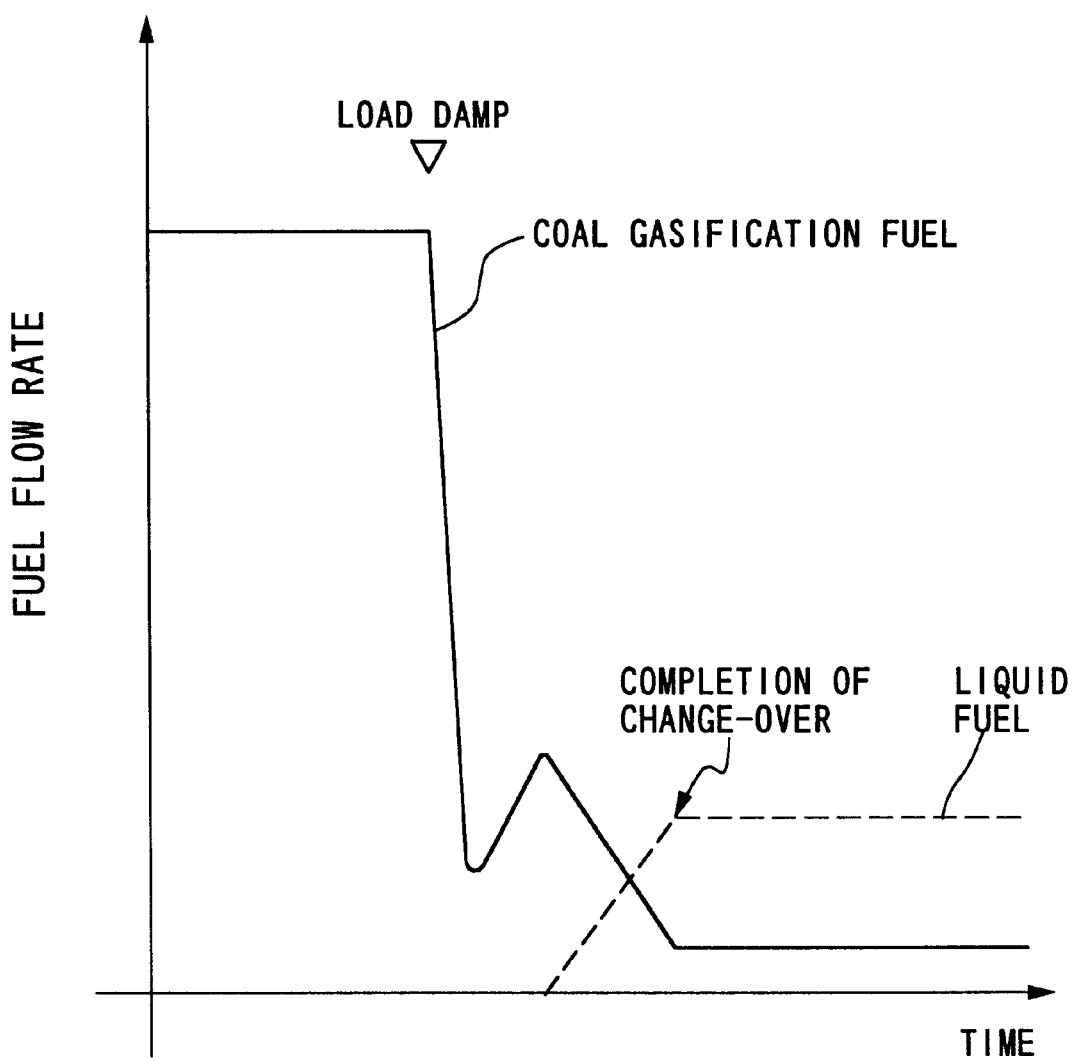
FIG. 8 is a graph showing a fuel flow characteristic to explain a sixth embodiment of the present invention.

Seventh Embodiment (FIG. 8)

This seventh embodiment shows an operating method of the coal gasification fuel combined cycle power generation plant according to the present invention. There is provided a method of preventing the combustion gas from conversely flowing into the coal gasification fuel passage by supplying the coal gasification fuel to the coal gasification fuel passage during the liquid fuel operation in the case where a change-over is made from an operation using the coal gasification fuel into an operation using the liquid fuel during the gas turbine load dump state.

More specifically, in the case where the gas turbine load is dumped during the coal gasification fuel operation, there is a need of decreasing the fuel supply amount to prevent an over speed from causing. In this case, it is difficult to carry out a combustion operation by a little coal gasification fuel in view of combustibility, and for this reason, the operation is changed into an operation by the combustion of the liquid fuel. After the change-over, the supply of the coal gasification fuel has been stopped in the conventional manner.

However, in this seventh embodiment, even during the liquid fuel operation, the coal gasification fuel is supplied to the combustor from the coal gasification fuel passage via the fuel nozzle.

FIG. 8 is a graph showing a fuel flow rate to explain the operating method, and taking a flow rate of liquid fuel and coal gasification fuel as an ordinate and taking a time as an abscissa.

As shown by a solid-line curve in FIG. 8, in this seventh embodiment, in the case where there is a load dump during the coal gasification fuel operation, a flow rate of the coal gasification fuel is reduced for a short time at the same time with the load dump. Further, as shown by a broken-line curve, the operation is changed into the liquid fuel operation. In this case, a little coal gasification fuel continues to be supplied to the coal gasification fuel passage without stopping the supply of the coal gasification fuel. According to this operation, it becomes possible to prevent the combustion gas from conversely flowing into the coal gasification fuel passage.

According to the operating method of this embodiment, in particular, the fuel nozzle has no need of change in its structure. Further, through only the fuel supply control, it becomes possible to securely prevent the combustion gas from conversely flowing into the coal gasification fuel passage as like as in the respective embodiments mentioned above. Therefore, the gas turbine operation can be stably carried out, and the life of the combustor can be made long. As a result, great advantage is obtainable in both the viewpoints of operation and economics of the power generation plant or facility.

Figure 9:
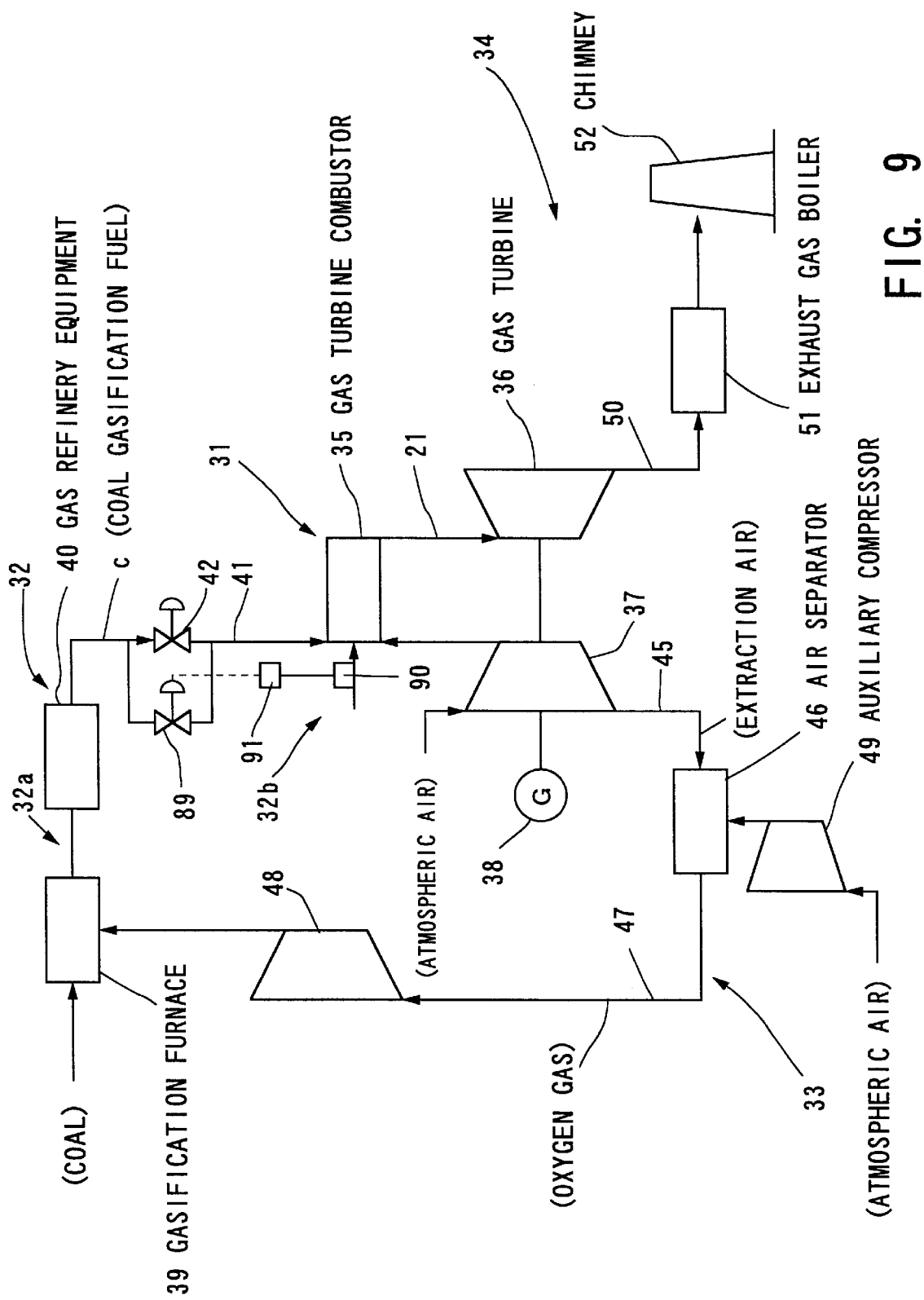
FIG. 9 shows a system diagram of a coal gasification combined cycle power generation plant according to a seventh embodiment of the present invention.
Figure 10:
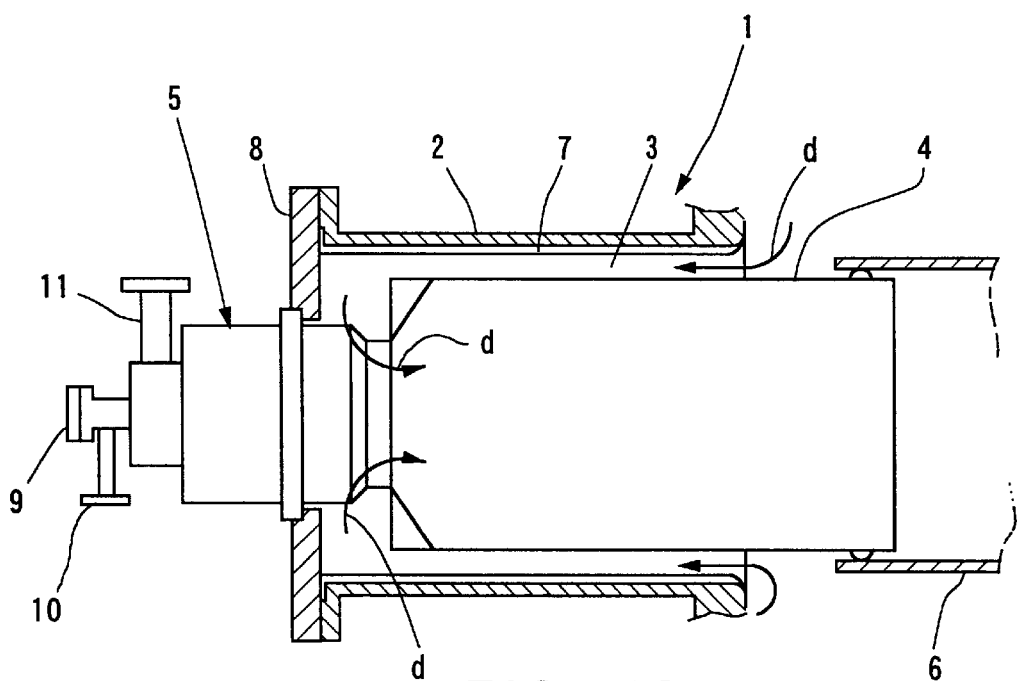
FIG. 10 is a sectional view schematically showing a convention al gas turbine combustor.
Figure 11:
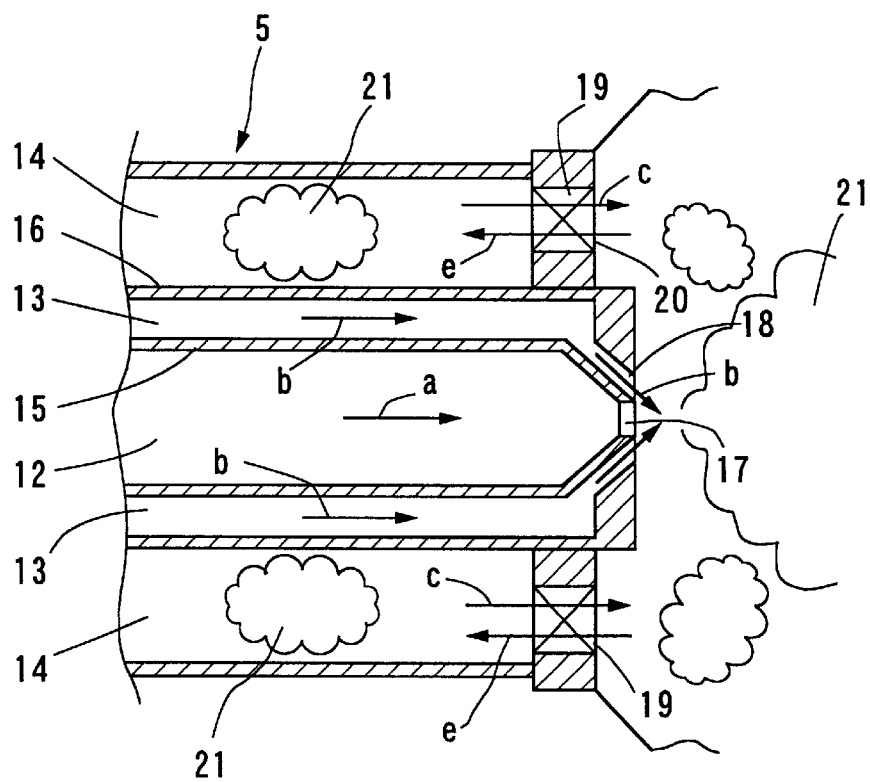
FIG. 11 is a partially sectional view showing the gas turbine combustor shown in FIG. 10.

Eighth Embodiment (FIG. 9)

This eighth embodiment shows a coal gasification combined cycle power generation plant which is preferable to the case of carrying out the operating method described with respect to the fifth to seventh embodiments and is an improvement in the coal gasification combined cycle power generation plant of the first embodiment shown in FIG. 1.

More specifically, according to the construction shown in FIG. 1, in the case of supplying the coal gasification fuel in order to prevent the combustion gas from conversely flowing into the coal gasification fuel passage during the liquid fuel operation, a flow rate is controlled by means of the flow control valve 42 mounted to the coal gasification fuel pipe 41. However, the flow control valve 42 is provided for controlling a flow rate of the coal gasification fuel "c" during a normal operation and is constructed in a manner that the flow rate of the coal gasification fuel "c" is controlled to the 100% load flow rate. For this reason, the flow control valve 42 is not always suitable to the control of a little coal gasification fuel "c" for preventing the combustion gas from conversely flowing.

Considering such circumstances, in this eighth embodiment, as shown in FIG. 9, the flow control unit provided on the coal gasification fuel pipe 41 is divided into two systems. More specifically, there is provided the flow control valve 42 which functions as a normal operation flow control unit for controlling the flow of the case of carrying out the coal gasification fuel operation. In addition to the flow control valve 42, there is provided an auxiliary flow control valve 89 which functions as an auxiliary flow control unit in the case of supplying a little coal gasification fuel "c" so as to prevent the combustion gas from conversely flowing into the coal gasification fuel passage during the liquid fuel operation. The other construction is the substantially same as that shown in FIG. 1, and therefore, the same reference numerals are used to designate parts corresponding to those shown in FIG. 1 and the details thereof are omitted herein.

As described above, the auxiliary flow control valve 89 for controlling a little coal gasification fuel "c" is provided, and thereby, it becomes possible to perform a precise flow control of the necessary and minimum coal gasification fuel. Therefore, it is possible to further improve a function of preventing the combustion gas from conversely flowing into the coal gasification fuel passage.

Further, in this eighth embodiment, there is provided a temperature detector 90 in the fuel nozzle for injecting the coal gasification fuel to the combustor 35 or at the vicinity thereof. In the case where the temperature detector 90 detects a temperature more than a fixed one, a control unit 91 for controlling the auxiliary flow control valve is provided. The control unit is set so as to secure the minimum flow rate for preventing the coal gasification fuel from conversely flowing into the fuel nozzle 65.

According to the structures mentioned above, a temperature rise of the coal gasification fuel passage is detected when the combustion gas conversely flows into the fuel nozzle, and thereby, it is possible to automatically supply the minimum flow rate of the coal gasification fuel "c" for preventing the combustion gas from conversely flowing to the coal gasification fuel passage.

As is evident from the above description, according to the present invention, it is possible to prevent the combustion gas from conversely flowing into the coal gasification fuel passage during the liquid fuel operation. Thus, the fuel nozzle is prevented from being damaged, so that the gas turbine operation can be stably carried out.

It is also to be noted that the present invention is not limited to the described embodiments and many other changes, modification and combinations may be made without departing from the scopes of the appended claims.

What is claimed is:

1. A coal gasification combined cycle power generation plant including a gas turbine system, a fuel supply system, an air supply system and an exhaust gas system, which are operatively connected to each other, said gas turbine system including a combustor provided with means for selectively burning a coal gasification fuel obtained by gasifying a coal and a liquid fuel atomized by an atomization air and a gas turbine to which a combustion gas generated in the combustor is supplied, said combustor being provided with a fuel nozzle, a liner disposed inside the combustor and a combustion air passage formed between the liner and an outer casing of the combustor, said fuel supply system being provided with a liquid fuel supply passage for the combustor through the fuel nozzle, an atomization air supply passage for the combustor through the fuel nozzle and a coal gasification fuel supply passage for the combustor through the fuel nozzle, all of said supply passages being arranged so as to be adjacent to each other, said atomization air supply passage being provided with an outlet portion to which a branching outlet port for injecting the atomization air toward an outlet portion of the coal gasification supply passage is formed.

2. A coal gasification combined cycle power generation plant according to any one of claim 1, further comprising a control unit provided for the coal gasification fuel supply passage for controlling a flow rate in a coal gasification operation.

3. A coal gasification combined cycle power plant according to claim 2, wherein said control unit includes a normal operation flow control means for controlling a flow rate in a coal gasification fuel operation and an auxiliary flow control means for controlling a flow rate of a little amount of the coal gasification fuel supplied in a use of the liquid fuel.

4. A coal gasification combined cycle power generation plant according to claim 3, further comprising a temperature detector provided for the fuel nozzle for injecting the coal gasification fuel to the combustor and a further control means for controlling the auxiliary flow control means which operates in a case where the temperature detector detects a temperature more than a fixed temperature, and the further control means is set so as to secure a minimum flow rate for preventing the coal gasification fuel from conversely flowing into the fuel nozzle.

* * * * *